Jan. 31, 1956  W. BENDER ET AL  2,732,761
MAGNIFYING GLASS WITH A GRIP
Filed Oct. 20, 1954
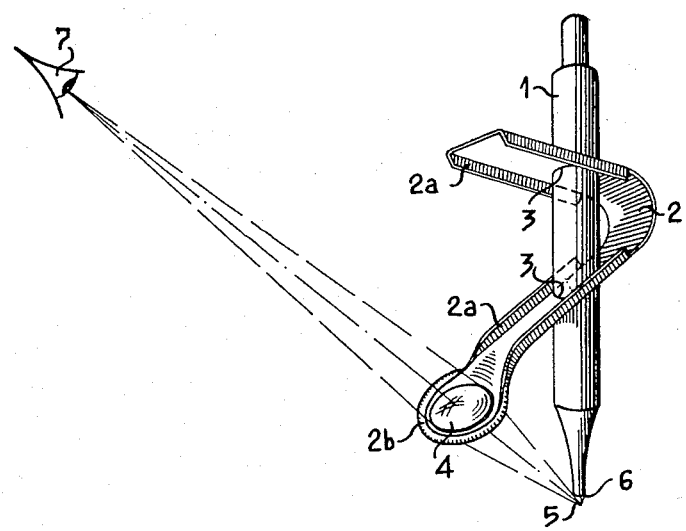
INVENTOR
Werner Bender
Johann Arni.
BY
ATTORNEY

United States Patent Office 2,732,761
Patented Jan. 31, 1956

2,732,761

MAGNIFYING GLASS WITH A GRIP

Werner Bender, Bern, and Johann Arni, Geneva, Switzerland, assignors to Tesa S. A., Renens, Switzerland, a corporation of Switzerland Application October 20, 1954, Serial No. 463,548

Claims priority, application Switzerland November 20, 1953

2 Claims. (Cl. 88—39)

It is often necessary, when machining a piece of work in a highly accurate manner, to examine the field of operation on the piece of work to be machined with a magnifying glass. The proper positioning of the magnifying glass often leads to difficulties inasmuch as the magnifying glass should be focused exactly onto the piece of work, while the instruments required during the machining such as tweezers, pincers, center punches, must simultaneously be handled so that generally both hands are occupied. The machining is nowadays executed generally, for instance in the case of the use of center punches, in a manner such that the tool is first secured accurately in position through the agency of the magnifying glass, the said magnifying glass being held through one hand and the center punch through the other hand. After adjustment, the magnifying glass is set aside so that the hand carrying it precedingly may serve for actuating a hammer. There is therefore no certainy that the punch will remain accurately in the desired position during the impact of the hammer.

Our invention removes this drawback and has for its object a magnifying glass provided with a grip incorporating guiding means for a manually controlled tool, said guiding means being such that the axis thereof crosses the optical axis of the magnifying glass. The hand-operated tool may be constituted in fact e. g. by a mere pencil. We have illustrated by way of example, in the accompanying drawing, a preferred embodiment of the object of our invention.

The single figure of said drawing shows in perspective view a center punch 1 and a spring blade 2 incurved so as to assume the shape of a U, the superposed arms of which are provided each with an aperture 3, the body of the center punch 1 passing with a slight clearance through said superposed apertures, which form thus guiding means for the said center punch.

The two apertures 3 are arranged in a manner such that the axis of the guiding means formed thereby crosses the optical axis of the magnifying glass.

The elastic action of the two arms of the spring blade 2 on the body of the center punch allow said spring blade to be held fast in any desired position of the body. The front end of the spring blade 2 carries a magnifying glass 4 so that the blade serves as a grip for the latter.

The focal length of the magnifying glass is selected in a manner such that its focus 5 coincides substantially with the tip 6 of the center punch. The observer 7 may thus look through the magnifying glass 4 so as to see the field of operation as enlarged by the latter, the field of vision through the magnifying glass registering always with the tip of the center punch. As apparent from inspection of the drawing, the two substantially rectilinear arms of the spring blade 2 are provided with lateral flanges 2a which form at one end 2b a mount for the magnifying glass. When urging the two arms towards each other, the spring blade is released with reference to the center punch so that the magnifying glass on the blade may slide longitudinally in parallelism with the axis of the center punch until its field of vision registers with the tip of the center punch i. e. with the point through which the tool is operative.

The manually-operated tool illustrated has been described only by way of exemplification and obviously the fundamental idea of the invention is applicable to many other hand-operated tools for which it is necessary to use a magnifying glass or the like lens with a view to obtaining the necessary accuracy or else by reason of the small size of the piece of work to be machined. The handoperated tool may also be constituted by a mere pencil.

In all cases, the magnifying glass is secured to the handoperated tool in a manner such that its focus coincides with the field of operation of said tool so that the piece of work to be machined may be seen clearly in the section thereof to be considered, whatever may be at the moment considered the position occupied for operation by said piece of work.

We claim:

1. A magnifying glass with a grip, comprising a substantially U-shaped spring blade the arms of which are provided each with an opening, the openings in the two arms registering with each other coaxially and being adapted to engage frictionally a tool to hold same during operation against fortuitous axial movement thereof with reference to the said tool-engaging openings and lateral flanges extending along both sides of at least one arm of the spring blade and forming together at the outer end of the corresponding arm a mount adapted to hold a magnifying glass and the axis of which crosses the axis of the openings registering with each other.

2. A compound tool-holding structure comprising an elastic blade bent into U-shape and provided with two apertures at corresponding points of the two arms of the U respectively, said apertures forming together a guiding channel, an elongated tool fitted frictionally through an adjustable section thereof in the channel formed by said apertures, a mount for a magnifying glass at the end of the blade facing the location of the operative end of the tool, the axis of said mount crossing the axis of the guiding channel and a magnifying glass fitted in said mount and the focus of which lies on the axis of the guiding channel to register with the operative end of the tool when adjusted correspondingly inside the guiding channel.

References Cited in the file of this patent

UNITED STATES PATENTS

| 1,505,220 | Shay | Aug. 19, 1924 |
| 2,041,229 | Chamberlin et al. | May 19, 1936 |
| 2,143,431 | Benzinger | Jan. 10, 1939 |
| 2,554,544 | Warner | May 29, 1951 |